United States Patent
Girt et al.

(10) Patent No.: US 9,311,948 B2
(45) Date of Patent: Apr. 12, 2016

(54) MAGNETIC LAYERING FOR BIT-PATTERNED STACK

(75) Inventors: Erol Girt, San Jose, CA (US); Dieter K. Weller, San Jose, CA (US); Alexander Y. Dobin, Hauppauge, NY (US); Bogdan F. Valcu, Fremont, CA (US); Thomas F. Ambrose, Sewickley, PA (US); Yingguo Peng, Pittsburgh, PA (US); Yukiko A. Kubota, Pittsburgh, OR (US); Abebe Hailu, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 320 days.

(21) Appl. No.: 12/347,141

(22) Filed: Dec. 31, 2008

(65) Prior Publication Data

US 2010/0165508 A1    Jul. 1, 2010

(51) Int. Cl.
| | |
|---|---|
| *G11B 5/66* | (2006.01) |
| *G11B 5/82* | (2006.01) |
| *B82Y 10/00* | (2011.01) |
| *G11B 5/74* | (2006.01) |

(52) U.S. Cl.
CPC . *G11B 5/82* (2013.01); *B82Y 10/00* (2013.01); *G11B 5/743* (2013.01)

(58) Field of Classification Search
None
See application file for complete search history.

(56) References Cited

U.S. PATENT DOCUMENTS

| | | | |
|---|---|---|---|
| 4,588,656 A | 5/1986 | Kitamoto et al. | |
| 4,731,300 A | 3/1988 | Watanabe et al. | |
| 4,745,510 A | 5/1988 | Watanabe et al. | |
| 4,775,576 A | 10/1988 | Bouchand et al. | |
| 5,432,012 A | 7/1995 | Lal et al. | |
| 5,851,643 A | 12/1998 | Honda et al. | |
| 5,851,660 A | 12/1998 | Tohma et al. | |
| 6,174,597 B1 | 1/2001 | Yusu et al. | |
| 6,468,670 B1 | 10/2002 | Ikeda et al. | |
| 6,534,206 B1 | 3/2003 | Kirino et al. | |

(Continued)

FOREIGN PATENT DOCUMENTS

| | | |
|---|---|---|
| JP | 2006-331578 | 12/2006 |
| JP | 2008-287853 | 11/2008 |

(Continued)

OTHER PUBLICATIONS

Takahashi et al. WO 2006/135034 A1 Published on Dec. 21, 2006.*

(Continued)

*Primary Examiner* — Mark Ruthkosky
*Assistant Examiner* — Linda Chau

(57) ABSTRACT

A perpendicular magnetic recording layer of a magnetic recording medium includes a plurality of bit-patterned magnetic islands, wherein each of the plurality of islands overlay a soft magnetic under-layer. Each of the magnetic islands includes a first magnetic sub-layer adjacent a second magnetic sub-layer, wherein the first sub-layer has a relatively high magnetic anisotropy that is greater than a magnetic anisotropy of the second sub-layer. The magnetic recording layer further includes a third sub-layer, which extends to connect each of the plurality of islands. The third sub-layer may have a magnetic anisotropy that is less than that of the second sub-layer of each of the magnetic islands and/or may serve as an interlayer, extending between the first sub-layer and the soft magnetic under-layer of the recording medium, and having a structure to help to produce the greater anisotropy first magnetic sub-layer.

10 Claims, 5 Drawing Sheets

(56) References Cited

U.S. PATENT DOCUMENTS

| | | | |
|---|---|---|---|
| 6,730,421 | B1 | 5/2004 | Kirino et al. |
| 6,738,207 | B1 | 5/2004 | Belser et al. |
| 6,777,066 | B1 | 8/2004 | Chang et al. |
| 6,828,036 | B1 | 12/2004 | Munteanu et al. |
| 6,893,542 | B1 | 5/2005 | Chen |
| 7,038,873 | B2 | 5/2006 | Shimazaki et al. |
| 7,177,118 | B2 | 2/2007 | Do et al. |
| 7,180,710 | B2 | 2/2007 | Do et al. |
| 7,235,314 | B2 | 6/2007 | Chen et al. |
| 7,384,699 | B2 | 6/2008 | Nolan et al. |
| 7,846,564 | B2 | 12/2010 | Li et al. |
| 8,048,545 | B2 | 11/2011 | Li et al. |
| 2003/0017369 | A1 | 1/2003 | Hirayama et al. |
| 2003/0128635 | A1 | 7/2003 | Ruigrok et al. |
| 2003/0157375 | A1 | 8/2003 | Uwazumi et al. |
| 2004/0013910 | A1 | 1/2004 | Acharya et al. |
| 2004/0053073 | A1 | 3/2004 | Lu et al. |
| 2004/0091748 | A1* | 5/2004 | Kamata et al. ............. 428/694 T |
| 2004/0166372 | A1 | 8/2004 | Haginoya et al. |
| 2004/0170869 | A1 | 9/2004 | Shin et al. |
| 2004/0247943 | A1 | 12/2004 | Girt et al. |
| 2005/0036225 | A1 | 2/2005 | Kai et al. |
| 2005/0084669 | A1 | 4/2005 | Girt et al. |
| 2005/0146992 | A1 | 7/2005 | Inomata et al. |
| 2005/0157597 | A1 | 7/2005 | Sendur et al. |
| 2005/0163962 | A1 | 7/2005 | Kawato et al. |
| 2005/0202286 | A1 | 9/2005 | Chen et al. |
| 2005/0227120 | A1 | 10/2005 | Ichihara et al. |
| 2005/0284842 | A1 | 12/2005 | Okawa et al. |
| 2006/0139799 | A1 | 6/2006 | Wu et al. |
| 2006/0204791 | A1 | 9/2006 | Sakawaki et al. |
| 2006/0226116 | A1 | 10/2006 | Haginoya et al. |
| 2006/0272937 | A1 | 12/2006 | McLeod et al. |
| 2006/0291100 | A1 | 12/2006 | Lu et al. |
| 2007/0058494 | A1 | 3/2007 | Murakami et al. |
| 2007/0072011 | A1* | 3/2007 | Li et al. ...................... 428/828.1 |
| 2007/0224453 | A1* | 9/2007 | Inamura et al. ............... 428/827 |
| 2008/0084635 | A1* | 4/2008 | Lee et al. ...................... 360/135 |
| 2008/0165453 | A1 | 7/2008 | Kaiser et al. |
| 2008/0292907 | A1* | 11/2008 | Berger et al. ................. 428/828 |
| 2009/0081484 | A1 | 3/2009 | Watanabe et al. |
| 2009/0141399 | A1 | 6/2009 | Sakawaki et al. |
| 2009/0231755 | A1* | 9/2009 | Takahashi et al. ............ 360/110 |
| 2012/0028078 | A1 | 2/2012 | Li et al. |

FOREIGN PATENT DOCUMENTS

| | | |
|---|---|---|
| WO | WO 2004/090874 | 10/2004 |
| WO | 2008-099859 | 8/2008 |

OTHER PUBLICATIONS

Victora, R.H., et al., "Exchange Coupled Composite Media for Perpendicular Magnetic Recording", IEEE Transactions on Magnetics, vol. 41, No. 10, Oct. 2005.

Zimanyi, Gergely et al., Abstract, "Optimizing Graded Recording Media", Mar. 2007.

Albrecht, Thomas, Abstract, "Patterned Magnetic Media: Recording Properties and Fabrication Issues", Mar. 2007.

Examination Report and Written Opinion for the Singapore Patent Appln No. 200908571-3, dated Feb. 15, 2011.

Xue et al. IEEE Transactions on Magnetics, vol. 32, No. 5, 1996, pp. 4081-4083.

Naoki Honda et al., Design Consideration of Ultrahigh-Density Perpendicular Magnetic Recording Media. IEEE Translations on Magnetics, vol. 38, No. 4, Jul. 2002, 1615-1621.

Aharoni, "Perfect and Imperfect Particles (Invited)", IEEE Translations on Magnetics, vol. Mag-22, No. 5. Sep. 1986, pp. 478-483.

Frei et al., "Critical Size and Nucleation Field of Ideal Ferromagnetic Particles," Physical Review, vol. 106, No. 3, May 1, 1957, pp. 446-454.

Aharoni, "Magnetization bucking in a prolate spheroid", J. Appl. Phys. vol. 60 No. 3, Aug. 1, 1986, pp. 1118-1123.

Aharoni et al., "Magnetization Curve of the Infinite Cylinder", Physical Review, vol. 109, No. 5, Mar. 1, 1958, pp. 1522-1528.

Richter, "Model calculations of the angular dependence of the switching field of imperfect ferromagnetic particles with special reference to barium ferrite", J. Appl. Phys. vol. 65 No. 9, May 1, 1989, pp. 3597-3601.

Brown, "Criterion for Uniform Micromagnetization", Physical Review, vol. 105, No. 5, Mar. 1, 1957, pp. 1479-1482.

Brown, "The Effect of Dislocation on Magnetization Near Saturation", Physical Review, vol. 60, Jul. 15, 1941, pp. 139-147.

Brown, "Theory of the Approach to Magnetic Saturation", Physical Review, vol. 58, Oct. 15, 1940, pp. 736-743.

Jacobs et al., "An Approach to Elongated Fine-Particle Magnets", Physical Review, vol. 100, No. 4, Nov. 15, 1955, pp. 1060-1067.

Braun, "Thermally Activated Magnetization Reversal in Elongated Ferromagnetic Particles", Physical Review, vol. 71, No. 21, Nov. 22, 1993, pp. 3557-3560.

From U.S. Appl. No. 11/235,208:—Notice of Allowance dated Aug. 2, 2010—Office Actions dated Apr. 9, 2010, Sep. 28, 2009, Mar. 5, 2009, Sep. 29, 2008.

From U.S. Appl. No. 12/962,553:—Notice of Allowance dated Jun. 23, 2011—Office Action dated Feb. 28, 2011.

From U.S. Appl. No. 13/270,715:—Notice of Allowance dated Apr. 4, 2013—Office Actions dated Jan. 18, 2013, Aug. 13, 2012, Apr. 16, 2012, Jan. 4, 2012.

* cited by examiner

MAGNETIC LAYERING FOR BIT-PATTERNED STACK

BACKGROUND

In recent years, significant increases in the storage capacity of magnetic bit-patterned recording media have been achieved by shrinking the size of each magnetic bit, thereby increasing the density thereof. Smaller magnetic islands are comprised of fewer magnetic grains and may, thus, be more susceptible to random heat or shock-induced changes in orientation. One way to improve the stability of each down-sized magnetic bit, or island, is to employ a relatively high anisotropy magnetic material. Yet, higher anisotropy can lead to an increased energy required in order to write to, or record information in, each bit. Investigators have looked into graded anisotropy media as a means to balance stability and writing efficiency. The present disclosure pertains to alternative designs of magnetic recording layers for magnetic bit-patterned recording media, which employ graded anisotropy to improve writing efficiency without compromising thermal stability.

SUMMARY

A magnetic recording layer of a magnetic recording medium includes a plurality of bit-patterned magnetic islands, wherein each of the plurality of islands overlay a soft magnetic under-layer. Each of the magnetic islands includes a first magnetic sub-layer adjacent a second magnetic sub-layer, and the magnetic recording layer further includes a continuous third sub-layer, which extends between and connects each of the plurality of islands. According to some embodiments, the continuous third sub-layer of the magnetic recording layer is magnetic and has a magnetic anisotropy that is less than a magnetic anisotropy of the second sub-layer of each of the magnetic islands of the magnetic recording layer; and the first sub-layer of each of the magnetic islands has a magnetic anisotropy that is greater than that of the second sub-layer. According to some alternate embodiments, the first magnetic sub-layer overlays the continuous third sub-layer of the magnetic recording layer, and the third sub-layer overlays the soft magnetic under-layer of the recording medium to form an interlayer having a structure to help produce the greater anisotropy of the first magnetic sub-layer.

BRIEF DESCRIPTION OF THE DRAWINGS

The following drawings are illustrative of particular embodiments of the disclosure and therefore do not limit the scope of the invention. The drawings are not to scale (unless so stated) and are intended for use in conjunction with the explanations in the following detailed description. Embodiments of the disclosure will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments.

Figure 1:
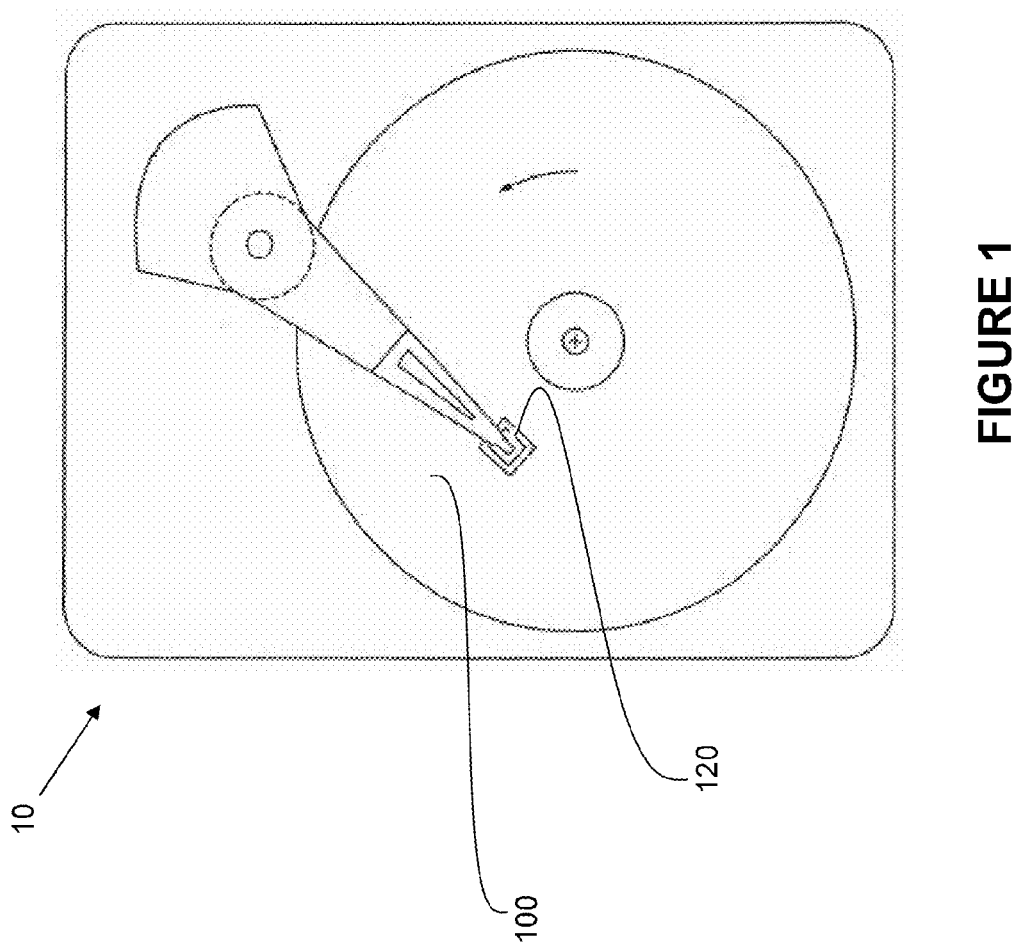
FIG. 1 is a plan view of a data storage system, which incorporates a magnetic recording medium in accordance with some embodiments of the present disclosure.

FIG. 1 is a plan view of a data storage system 10, which incorporates a magnetic recording medium 100 in accordance with some embodiments of the present disclosure. FIG. 1 illustrates system 10 further including a magnetic read/write head 120, for example, as is known to those skilled in the art, that includes an inductive writing element 12, which is shown, in FIG. 2, generating a magnetic field H for recording.

Figure 2:
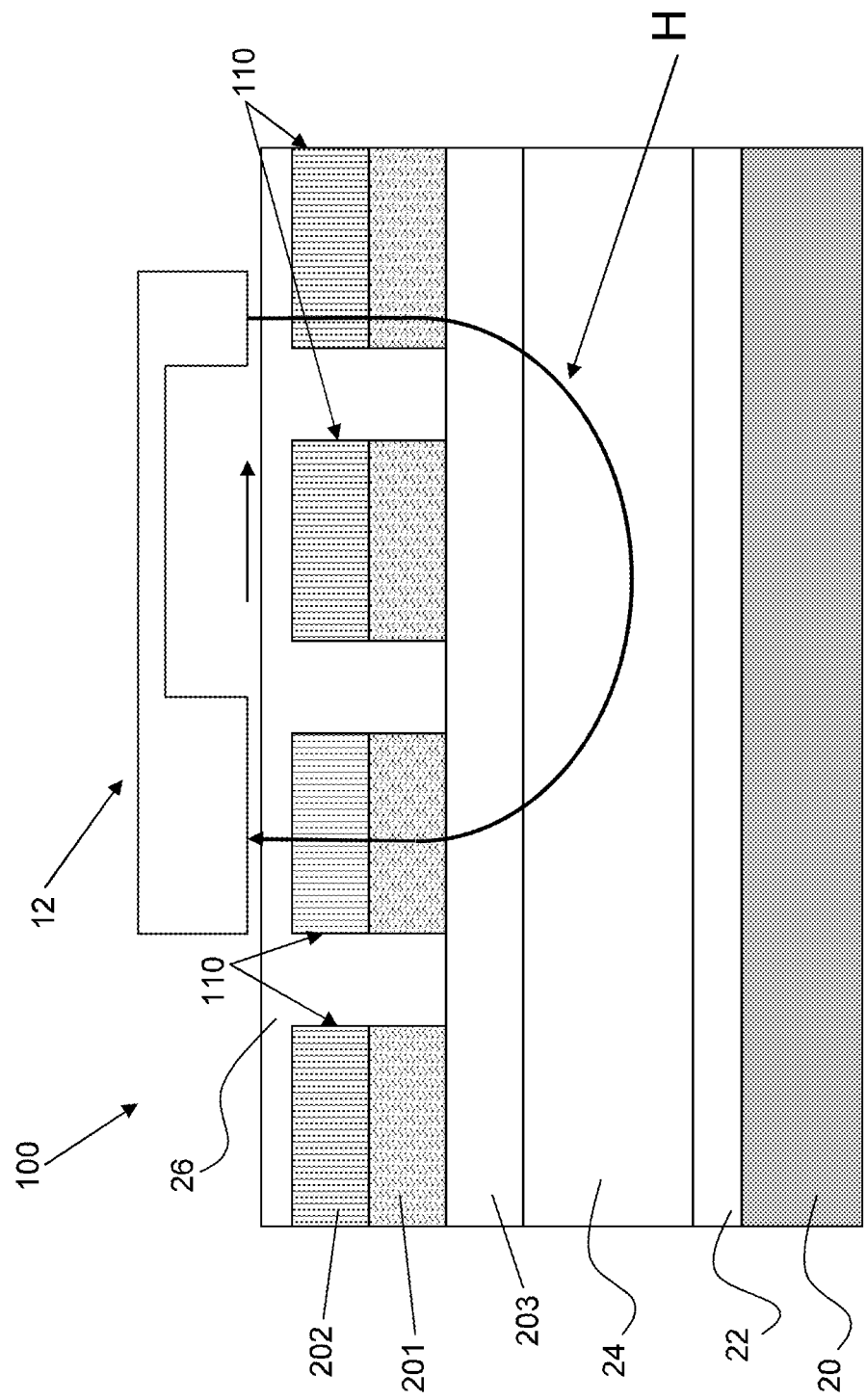
FIG. 2 is a schematic section through a portion of the system shown in FIG. 1, according to some embodiments.

FIG. 2 is a schematic section through a portion of system 10, according to some embodiments. FIG. 2 illustrates a non-magnetic protective layer 26 (e.g. carbon, Ru, Cr) of medium 100 overlaying a recording layer of medium 100, which recording layer includes a plurality of bit-patterned magnetic islands 110, or bits, overlaying a soft magnetic under layer 24 of medium 100; each magnetic island 110 includes a first magnetic sub-layer 201 and a second magnetic sub-layer 202, and the recording layer further includes a continuous third sub-layer 203, which extends to connect islands 110. FIG. 2 further illustrates an optional cohesive layer 22 (e.g. Ta, Cr, CrTa, Ti) extending between soft magnetic under layer 24 and a non-magnetic substrate 20 (e.g. glass).

According to some embodiments, first magnetic sub-layer 201 has a magnetic anisotropy that is greater than that of second magnetic sub-layer 202, and third sub-layer 203 forms an interlayer between first magnetic sub-layer 201 and soft magnetic under-layer 24, which interlayer has a structure to help produce the greater magnetic anisotropy of first sub-layer 201. A thickness of continuous sub-layer 203, as the interlayer, may be between approximately 0.3 nm and approximately 30 nm. If first magnetic sub-layer 201 is comprised of a hexagonal close-packed (hcp) CoPt, a rare earth Co5, or a multi-layer Co/(Pt, Pd) face-centered cubic (fcc), third sub-layer 203, as the interlayer, may be at least one of: a fcc Ni alloy, a hcp Co alloy, a hcp Ti alloy, a hcp Ru alloy, a fcc Cu, a fcc Ag, a fcc Pt, a fcc Au, and a fcc Pd. The embodiment wherein the fcc Ni alloy forms third sub-layer 203 preferably consists of Ni and at least one of: Cr (up to 25 at. %), Mo (up to 12 at. %), W (up to 12 at. %), Ir (up to 100 at. %), Ru (up to 30 at. %), Re (up to 15 at. %), Fe (up to 60 at. %), and Co (up to 100 at. %). The embodiment wherein the hcp Co alloy forms third sub-layer 203 preferably consists of Co and at least one of: Pt, Pd, Ru, Re, Cr, Ta, Ni and Ir. The embodiment wherein the hcp Ti alloy forms third sub-layer 203 preferably consist of Ti and at least one of: Co, Ru, Re, Ir and Cr. The embodiment wherein the hcp Ru alloy forms third sub-layer 203 preferably consists of Ru and at least one of: Cr (up to 50 at. %), Re (up to 100 at. %) and Ir (up to 100 at. %). If first magnetic sub-layer 201 is $L1_0$(Co, Fe)(Pt, Pd)-based, third sub-layer 203, as the interlayer, may be at least one of: MgO, CoO, FeO, NiO, RuAl and CrRu. Soft magnetic under-layer 24 may be amorphous or crystalline and either composed of a single layer, anti-ferromagnetically coupled magnetic sub-layers, or a an antiferromagnetic sub-layer in combination with a ferromagnetic sub-layer.

Figure 3:
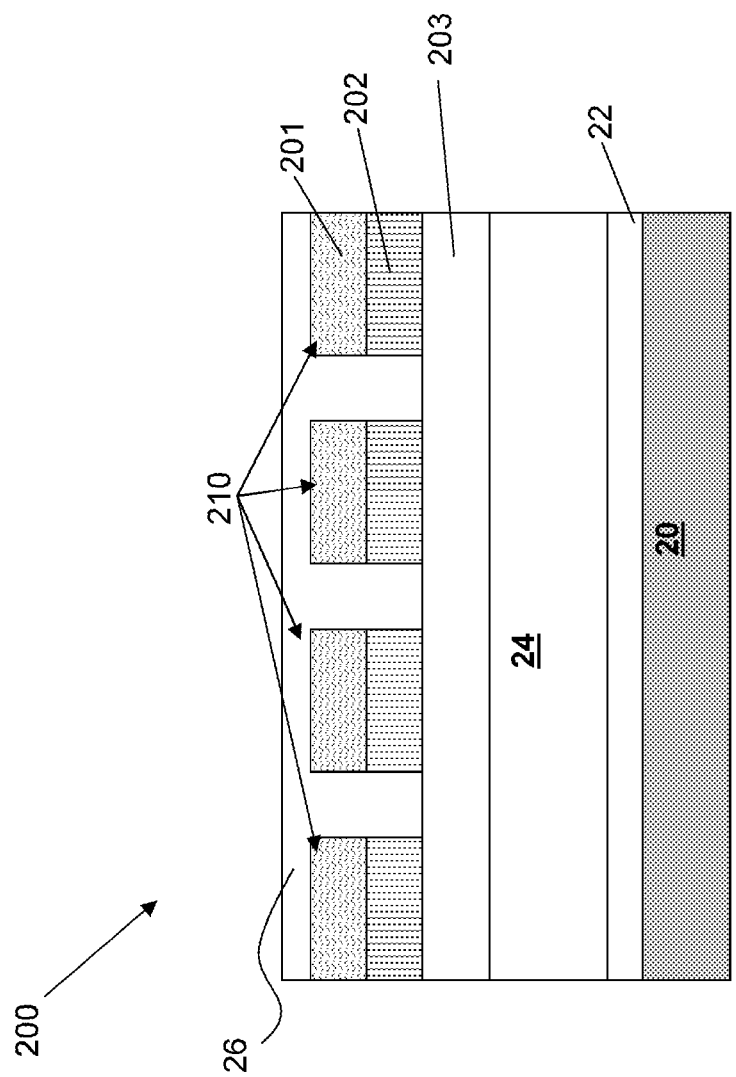
FIG. 3 is a schematic section, through a magnetic recording medium, according to some alternative embodiments.

According to some embodiments, continuous third sub-layer 203 is magnetic, connects all magnetic islands 110 of medium 100, and has a magnetic anisotropy that is less than that of second sub-layer 202 of each of islands 110, to reduce a demagnetization field; and likewise for islands 210 shown in FIG. 3. FIG. 3 is a schematic section, through a magnetic recording medium 200, according to some alternative embodiments. FIG. 3 illustrates a recording layer of medium 200 including magnetic islands 210, wherein each first sub-layer 201, which has a magnetic anisotropy greater than that of each second sub-layer 202, overlays the corresponding second sub-layer 202, which overlays continuous third sub-layer 203. It should be noted that, throughout the detailed description, for each embodiment, first magnetic sub-layer 201 should be considered to have a higher magnetic anisotropy than that of second magnetic sub-layer 202.

Figure 4:
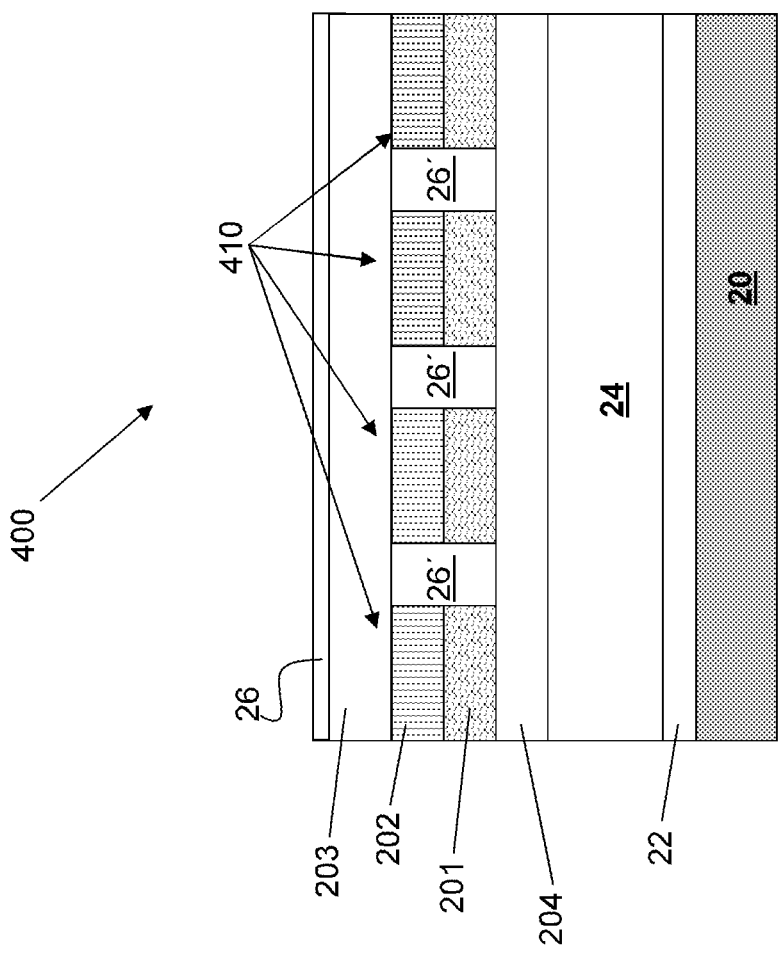
FIG. 4 is a schematic section, through a magnetic recording medium, according to some additional embodiments.

FIG. 4 is a schematic section, through a magnetic recording medium 400, according to some additional embodiments. FIG. 4 illustrates each magnetic island 410 of a recording layer of medium 400 configured such that each first magnetic sub-layer 201 overlays an interlayer 204, which may be formed similar to any of the interlayer embodiments of third sub-layer 203, which were described in conjunction with FIG. 2. FIG. 4 further illustrates continuous third sub-layer 203, which is the magnetic embodiment described in the preceding paragraph, overlaying each second magnetic sub-layer 202, thereby connecting each island 410 and reducing the demagnetization field. According to alternate embodiments, an arrangement of sub-layers 201 and 202 may be switched, such that second sub-layer 202 interfaces with interlayer 204. With further reference to FIG. 4, it should be noted that non-magnetic material 26', for example, similar to that which forms protective layer 26 is interposed between islands 410.

Figure 5:
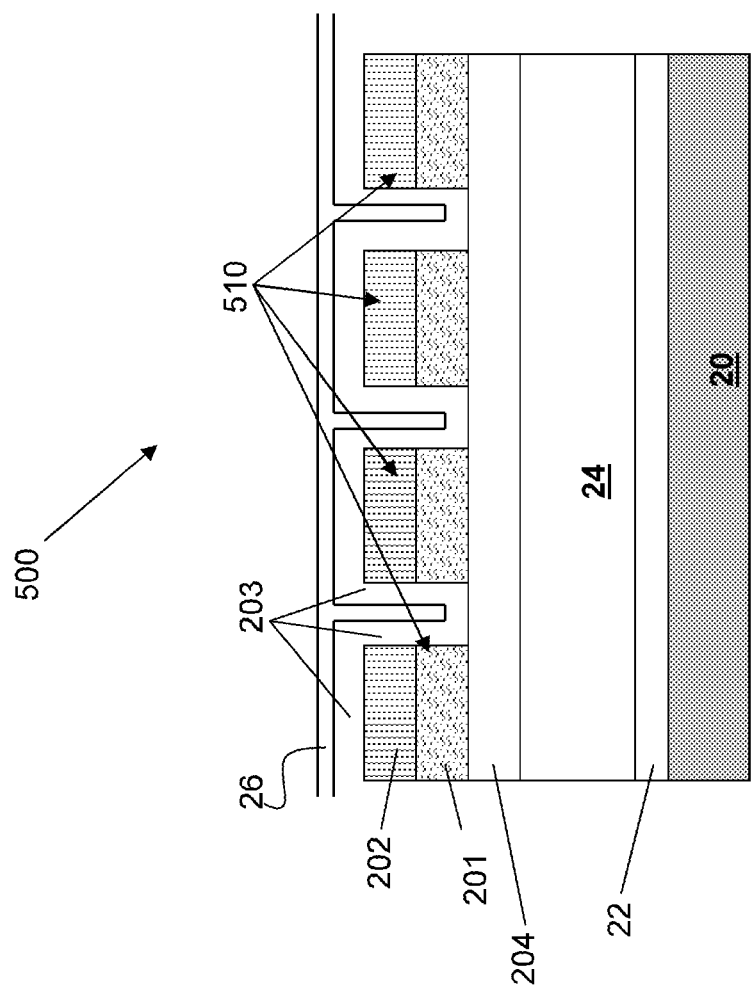
FIG. 5 is a schematic section, through a magnetic recording medium, according to yet further embodiments.

FIG. 5 is a schematic section, through a magnetic recording medium 500, according to yet further embodiments. FIG. 5 illustrates each magnetic island 510 of a recording layer of medium 500 configured such that each first magnetic sub-layer 201 overlays interlayer 204, as in FIG. 4. FIG. 5 further illustrates continuous third magnetic sub-layer 203 both overlaying each second magnetic sub-layer 202 and extending alongside each of islands 510 to interface with interlayer at locations therebetween. According to alternate embodiments, an arrangement of sub-layers 201 and 202 may be switched, such that second sub-layer 202 interfaces with interlayer 204.

According to some preferred embodiments, of any of the configurations described above, in conjunction with FIGS. 1-5, the greater magnetic anisotropy of first sub-layer 201 is constant, while the lower magnetic anisotropy of second sub-layer 202 varies across a thickness thereof, either from a maximum, at a side thereof that interfaces with first sub-layer 201, to a minimum at an opposite side thereof, or visa-versa. It should be noted that the maximum magnetic anisotropy, of the thickness-varying anisotropy of sub-layer 202, is always less than the magnetic anisotropy of first sub-layer 201. According to further embodiments, of any of the configurations described above, in conjunction with FIGS. 1-5, the magnetic anisotropy of both sub-layers 201, 202 is constant across a thickness thereof, and a saturation magnetization of first sub-layer 201 is less than that of second sub-layer 202.

In the foregoing detailed description, embodiments of the disclosure have been described. These implementations, as well as others, are within the scope of the appended claims.

We claim:

1. A system comprising:
a non-magnetic substrate;
a soft magnetic under-layer overlaying the substrate with anti-ferromagnetically coupled magnetic sub-layers;
a perpendicular magnetic recording layer comprising a plurality of bit-patterned magnetic features, each of the magnetic features overlaying the soft magnetic under-layer and each feature comprising a first magnetic sub-layer adjacent a second magnetic sub-layer, the recording layer further comprising a continuous third magnetic sub-layer overlaying the magnetic features to connect each of the magnetic features; and
a non-magnetic material layer deposited between each of the magnetic features;
wherein the first sub-layer of each of the magnetic features of the perpendicular magnetic recording layer has a magnetic anisotropy that is preconfigured to be consistently greater than a magnetic anisotropy of the second sub-layer of each of the magnetic features, and
wherein the second sub-layer of each of the magnetic features is configured for perpendicular magnetic recording; and
wherein the magnetic anisotropy of the second sub-layer of each of the plurality of magnetic features varies across a thickness of the second sub-layer from a maximum to a minimum and the minimum magnetic anisotropy of the second sub-layer of each of the magnetic features is greater than a magnetic anisotropy of the continuous third sub-layer of the perpendicular magnetic recording layer, and wherein the first sub-layer of each of the magnetic features of the perpendicular magnetic recording layer overlays the corresponding second sub-layer of each of the magnetic features.

2. The system of claim 1, wherein the continuous third sub-layer of the perpendicular magnetic recording layer extends between the magnetic features of the perpendicular magnetic recording layer and the non-magnetic material layer.

3. The system of claim 1, wherein the continuous third sub-layer of the perpendicular magnetic recording layer overlays the first sub-layer of each of the magnetic features of the perpendicular magnetic recording layer.

4. The system of claim 1, wherein the thickness-varying magnetic anisotropy of the second sub-layer of each of the magnetic features is at the maximum at least at an interface with the corresponding first sub-layer of each of the magnetic features.

5. The system of claim 1, wherein the thickness-varying magnetic anisotropy of the second sub-layer of each of the magnetic features is at the minimum at least at an interface with the corresponding first sub-layer of each of the magnetic features.

6. The system of claim 1, wherein the second sub-layer of each of the magnetic features of the perpendicular magnetic recording layer overlays the corresponding first sub-layer of each of the magnetic features.

7. The system of claim 3, further comprising a continuous interlayer overlaying the soft magnetic under-layer extending to connect each of the magnetic features.

8. The system of claim 7, wherein the continuous interlayer has a thickness between approximately 0.3 nm and 30 nm.

9. The system of claim 7, wherein the continuous interlayer comprises at least one of a face-centered cubic Ni alloy, a hexagonal close-packed Co alloy, a hexagonal close-packed Ti alloy, a hexagonal close-packed Ru alloy, a face-centered cubic Cu, a face-centered cubic Ag, a face-centered cubic Pt, a face-centered cubic Au, or a face-centered cubic Pd.

10. The system of claim 7, wherein the continuous interlayer comprises at least one of MgO, CoO, FeO, NiO, RuAl, or CrRu.

* * * * *